(12) United States Patent
Porak et al.

(10) Patent No.: US 12,038,625 B2
(45) Date of Patent: Jul. 16, 2024

(54) METHOD FOR PRODUCING AT LEAST ONE NOSE PAD FOR VIEW DETECTION GLASSES

(71) Applicant: VIEWPOINTSYSTEM GMBH, Vienna (AT)

(72) Inventors: Lukas Porak, Vienna (AT); Jan Blatt, Vienna (AT)

(73) Assignee: VIEWPOINTSYSTEM GMBH, Vienna (AT)

( * ) Notice: Subject to any disclaimer, the term of this patent is extended or adjusted under 35 U.S.C. 154(b) by 579 days.

(21) Appl. No.: 17/292,546

(22) PCT Filed: Nov. 8, 2019

(86) PCT No.: PCT/EP2019/080688
§ 371 (c)(1),
(2) Date: May 10, 2021

(87) PCT Pub. No.: WO2020/094845
PCT Pub. Date: May 14, 2020

(65) Prior Publication Data
US 2022/0004020 A1    Jan. 6, 2022

(30) Foreign Application Priority Data
Nov. 9, 2018  (AT) .............................. A 50965/2018

(51) Int. Cl.
*G02C 5/12*      (2006.01)
*G02C 13/00*     (2006.01)

(52) U.S. Cl.
CPC ........... *G02C 5/126* (2013.01); *G02C 13/005* (2013.01)

(58) Field of Classification Search
CPC .................... G02C 13/003; G02C 13/005
(Continued)

(56) References Cited

U.S. PATENT DOCUMENTS

| 9,668,648 B2 | 6/2017 | Pfleger et al. |
| 2015/0127132 A1 | 5/2015 | Nyong'o et al. |

(Continued)

FOREIGN PATENT DOCUMENTS

| AT | 513987 B1 | 9/2014 |
| WO | 2016164859 A1 | 10/2016 |

(Continued)

OTHER PUBLICATIONS

Office Action in Austria Application No. A 50965/2018, mailed Aug. 14, 2019, 3 pages.

(Continued)

*Primary Examiner* — Travis S Fissel
(74) *Attorney, Agent, or Firm* — Liang & Hennessey LLP; Brian Hennessey

(57) ABSTRACT

The invention relates to a method for producing at least one nose pad for view detection glasses. According to the invention, a topography of at least the nasal ridge of a person is detected and topography data are generated. In a scaling step, at least one position value of the person's eyes is captured by means of the eye capturing cameras of the view detection glasses, and thus, the non-scaled topography data are converted into scaled topography data. In a modeling step, production data are generated from the scaled topography data for at least one nose pad for the view detection glasses adapted to the nasal ridge. In a fabrication step, the production data of the modeling step are transmitted to a digital fabricator, and based on the production data, at least one nose pad is produced.

11 Claims, 1 Drawing Sheet

(58) Field of Classification Search
USPC ........ 351/88, 87, 65, 69, 70, 71, 76, 78, 79, 351/131, 132, 136, 178
See application file for complete search history.

(56) References Cited

U.S. PATENT DOCUMENTS

| | | |
|---|---|---|
| 2015/0277155 A1 | 10/2015 | Raviv |
| 2018/0067340 A1 | 3/2018 | Chumbley et al. |
| 2019/0033624 A1* | 1/2019 | Breuninger .......... G02C 13/005 |

FOREIGN PATENT DOCUMENTS

| | | |
|---|---|---|
| WO | 2018087386 A1 | 5/2018 |
| WO | 2018154271 A1 | 8/2018 |

OTHER PUBLICATIONS

International Search Report and Written Opinion in International Application No. PCT/EP2019/080688, mailed Feb. 21, 2020, 17 pages.

* cited by examiner

METHOD FOR PRODUCING AT LEAST ONE NOSE PAD FOR VIEW DETECTION GLASSES

CROSS-REFERENCE TO RELATED APPLICATIONS

The present application is a national phase application of PCT Application No. PCT/EP2019/080688, filed Nov. 8, 2019, entitled "METHOD FOR PRODUCING AT LEAST ONE NOSE PAD OF VIEW DETECTION GLASSES", which claims the benefit of Austrian Patent Application No. 50965/2018, filed Nov. 9, 2018, each of which is incorporated by reference in its entirety.

BACKGROUND OF THE INVENTION

1. Field of the Invention

The invention relates to a method for producing at least one nose pad for view detection glasses.

2. Description of the Related Art

Glasses are worn, among other places, on the nose of the wearer of the glasses. The glasses either lie directly on the nose by means of the frame, or the glasses contact the nose via so-called nose pads or via a saddle bridge. The position of the glasses, in particular the lenses of the glasses, relative to the eyes of the wearer of the glasses is determined from the contact situation on the nose and the contact situation of the earpieces on the ears.

Some people have very different physical characteristics. The range of variation is so great within the total number of people that it is practically impossible to design a universal eyeglass frame that is equally suitable for all people.

The manufacturers of optical frames of glasses therefore offer frames of different sizes or widths, the local trade keeping in stock the sizes that correspond to the widespread physiognomic features in the region. Different sized frames do not present a problem visually since lenses of glasses are individually ground and adapted to the respective frame.

In the case of glasses which, however, have or represent measuring devices, the glasses or the frame contain substantial elements which are essential for the function of such glasses. This is the case, for example, with glasses which are designed to detect the direction of view of the wearer. In the case of these glasses, the assemblies that ensure the actual function of glasses of this type are arranged in the frame of the glasses and not in the lenses. In the frame of the glasses of this type, a large number of electronic components are arranged in a limited space. It is therefore not possible to reduce or enlarge the frame of the glasses of this type in a simple manner in order to adapt it to different people. Because of the mutual influence of adjacent electronic components, highly integrated electronic devices of this type cannot simply be converted since factors such as crosstalk, capacitive or inductive coupling and shielding must be taken into account. Glasses of this type therefore have a "standard frame."

Glasses of this type, which are also referred to as view detection glasses, are known from U.S. Pat. No. 9,668,648.

It has been shown that the correct fit of view detection glasses of this type directly influences the functionality and the detection accuracy, and is therefore particularly important for view detection glasses of this type. In the case of a person whose head does not harmonize with the dimensions of view detection glasses of this type, the view detection glasses slip or, in the other case, are too tight. In both cases, it is no longer possible to wear view detection glasses of this type for longer periods of time, such as an entire working day. If the differences between the head and view detection glasses go further, the eyes of the wearer can no longer be detected by the eye capturing cameras. Compensating for such a state by adapting the eye capturing cameras is usually not possible.

Since the eye capturing cameras are arranged directly in the nose part frame in the currently most advanced view detection glasses, an adaptation via wire bracket-mounted nose pads is also not possible.

Another disadvantage of known methods for adapting glasses to a person's head is that parts of the person's head, in particular the nose, can be deformed during the adaptation of the view detection glasses, which results in a poor fit of the view detection glasses.

SUMMARY OF THE INVENTION

The object of the invention is therefore to provide a method of the type mentioned at the outset with which the mentioned disadvantages can be avoided, with which the view detection glasses can be adapted to an individual wearer in a simple, contact-free, and precise manner, and long and fatigue-free wearing of the view detection glasses is made possible.

According to the invention, this is achieved by the features disclosed herein. As a result, view detection glasses can be adapted to an individual wearer in a simple, contact-free, and precise manner. The high accuracy of fit allows for long and fatigue-free wearing of the view detection glasses. It has been shown that the nose pad is particularly relevant or central for adapting the view detection glasses to different people.

As a result, view detection glasses can be adapted easily and contact-free to different heads or faces, in particular to different nose shapes. This allows for the view detection glasses to be adapted very precisely to an individual head. The at least one nose pad is modeled as a counterpart to the respective nose, in particular to the respective nasal ridge, whereby a very good fit of the view detection glasses is achieved, whereby a slipping of the view detection glasses from the ideal position is reduced. The adaptation to very different nose shapes is possible without contact, as a result of which inaccuracies that occur due to deformation of the nose during the adaptation of the at least one nose pad are avoided. Due to the precise fit of the view detection glasses, the view detection glasses stay securely on the head even when the wearer moves quickly. As a result, view detection glasses can easily be adapted very precisely to different heads or faces, in particular to different nose shapes.

As a result, view detection glasses can be adapted quickly and precisely to a wearer. This means that very precise measurements or activities can be carried out with the view detection glasses after only a short adaptation period. View detection glasses are often used by a plurality of different people in turns, so that a short adaptation time is important.

In addition, the adaptation can also be made by less experienced people, so that a trained optician is not required.

The invention further relates to view detection glasses having at least one nose pad.

The object of the invention is therefore to provide view detection glasses having at least one nose pad, with which the mentioned disadvantages can be avoided, which can be adapted to a person in a simple, contact-free, and precise manner.

The advantages asserted above can thereby be achieved.

Express reference is hereby made to the wording of the claims, whereby the claims are inserted into the description at this point by reference and are considered to be reproduced verbatim.

BRIEF DESCRIPTION OF THE DRAWINGS

The invention is described in more detail with reference to the accompanying drawings, in which only one preferred embodiment is shown by way of example. In the drawings.

DETAILED DESCRIPTION

Figure 1:
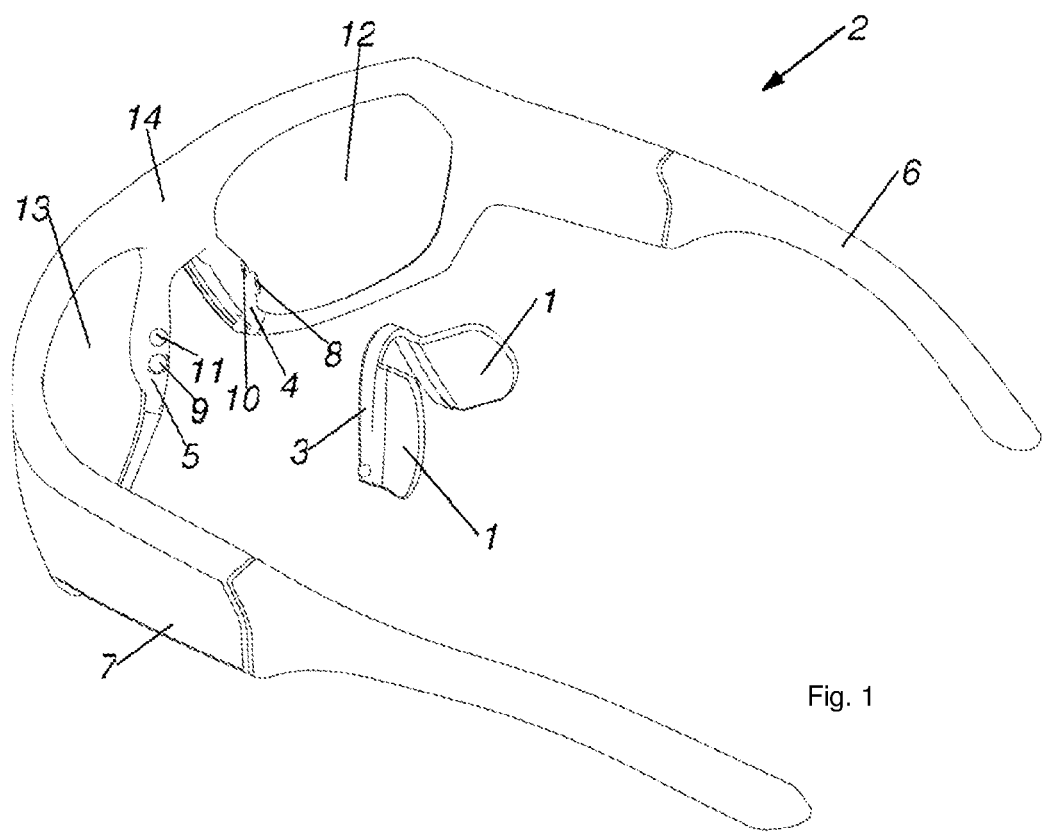
FIG. 1 shows objective view detection glasses having a nose pad and a nose pad holder in an axonometric exploded view.

A method for producing at least one nose pad 1 for view detection glasses 2 for a person is provided, which view detection glasses 2 have a right eye capturing camera 8, a left eye capturing camera 9, and a field of view camera 15. In the scope of this method, at least the following steps are provided, which—unless absolutely necessary—the order in which they are listed does not also have to represent the order in which the individual method steps are carried out.

In a measuring step, a topography of at least the nasal ridge of the person is detected and topography data are generated, wherein the detection of the topography takes place in the measuring step by means of a camera 8, 9, 15 which is moved in front of the face and to the side of the person's head in order to generate non-scaled topography data of the measured region of the head from a plurality of recorded images.

In a scaling step, the view detection glasses 2, comprising a predefinable basic setting nose pad, are arranged on the head of the person. At least one position value of the eyes of the person is determined by means of the eye capturing cameras (8, 9), wherein the non-scaled topography data are converted into scaled topography data based on the at least one position value.

In a modeling step, production data for at least one nose pad 1 for the view detection glasses 2 adapted to the nasal ridge are generated from the scaled topography data.

In a fabrication step, the production data from the modeling step are transmitted to a digital fabricator. At least one nose pad 1 is produced based on the production data.

As a result, view detection glasses 2 can be adapted to an individual wearer in a simple, contact-free, and precise manner. The high accuracy of fit allows for long and fatigue-free wearing of the view detection glasses 2. It has been shown that the nose pad is particularly relevant or central for adapting the view detection glasses 2 to different people.

As a result, view detection glasses 2 can be adapted easily and contact-free to different heads or faces, in particular to different nose shapes. This allows for the view detection glasses 2 to be adapted very precisely to an individual head. The at least one nose pad 1 is modeled as a counterpart to the respective nose, in particular to the respective nasal ridge, whereby a very good fit of the view detection glasses 2 is achieved, whereby a slipping of the view detection glasses 2 from the ideal position is reduced. The adaptation to very different nose shapes is possible without contact, as a result of which inaccuracies that occur due to deformation of the nose during the adaptation of the at least one nose pad 1 are avoided. Due to the precise fit of the view detection glasses 2, the view detection glasses 2 stay securely on the head even when the wearer moves quickly. As a result, view detection glasses 2 can easily be adapted very precisely to different heads or faces, in particular to different nose shapes.

As a result, view detection glasses 2 can be adapted quickly and precisely to a wearer. This means that very precise measurements or activities can be carried out with the view detection glasses 2 after only a short adaptation period. View detection glasses 2 are often used by a plurality of different people in turns, so that a short adaptation time is important. In addition, the adaptation can also be made by less experienced people, so that a trained optician is not required.

The present invention relates to the adaptation of view detection glasses 2 to the head of a wearer. The adaptation is made by changing the position of the view detection glasses 2 on the nose of the wearer or user by changing specific dimensions at the contact points to the nose in order to improve their position or the fit on the nose of a specific, individual wearer.

The nose pad 1 thus spaces the frame of the glasses from the nose and brings about the correct fit of the view detection glasses 2 on the nasal ridge. In other words, the nose pad 1 can function as a contact zone or contact surface between the frame of the glasses and the nasal ridge or the base of the nose.

In a measuring step, a topography of at least the nasal ridge of the person is detected and topography data are generated. The measurement step is contact-free, which means that the nose is not subject to any deformation during measurement. The topography data generated in the measurement step reflect the surface of at least the nasal ridge of the person. In the modeling step, production data for at least one, preferably two, nose pads 1 of the view detection glasses 2 that are adapted to the nasal ridge of the person are generated from the topography data of the measurement step. The modeling step is preferably computer-controlled. The production data are in particular CAD data. In the fabrication step, the production data from the modeling step are transmitted to a digital fabricator which produces at least one nose pad (1) based on the production data.

In the fabrication step, larger parts of the view detection glasses 2 such as the nose pad holder 3, earpiece 6, 7 or the base body of the view detection glasses 2 and the frame of the glasses can be produced by means of the digital fabricator. A digital fabricator, also known as a "fabber," is a production machine that generates 3-dimensional shapes from production data. Well-known digital fabricators are, for example, 3D printers or CNC machines.

Furthermore, view detection glasses 2 having at least one nose pad 1 are provided, the at least one nose pad 1 being adapted according to the method in question and being produced by means of a digital fabricator.

View detection glasses 2 denote glasses which have at least two eye capturing cameras 8, 9 and can carry out so-called eye tracking.

Figure 2:
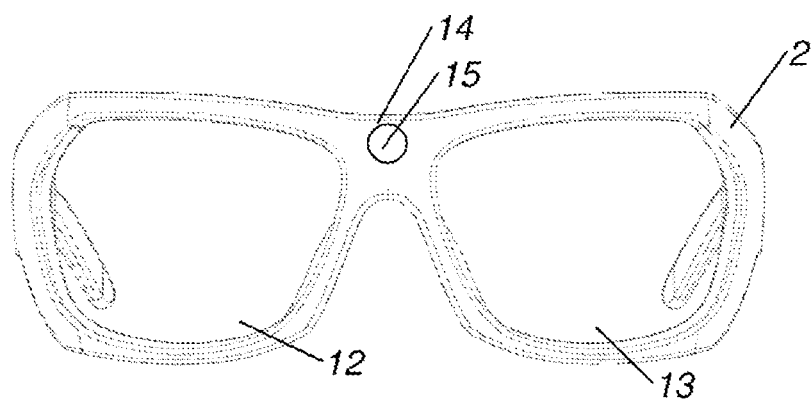
FIG. 2 shows the view detection glasses according to FIG. 1 in elevation.

The view detection glasses 2 can also fulfill other functions in the context of augmented reality glasses or virtual reality glasses. FIGS. 1 and 2 show a preferred embodiment of view detection glasses 2 as described in AT 513 987 B, for example.

Information relating to "right" and "left" relating to the view detection glasses 2 is to be understood from the perspective of the wearer of the glasses.

The preferred embodiment of view detection glasses 2 shown in FIG. 1 comprises, as is customary per se, a right and a left viewing opening 12, 13 as well as a right earpiece 6 and a left earpiece 7, which are provided to hold the view detection glasses 2 on the ears of the wearer. The viewing openings 12, 13 are at least partially enclosed by parts of a frame. These two parts of the frame are connected using a so-called nose bridge 14. The right region of the frame, which is arranged next to the nose of the wearer, is referred to as the right nose part frame 4. The left region of the frame, which is arranged next to the nose of the wearer, is referred to as the left nose part frame 5. The two nose part frames 4, 5 end where the nose bridge 14 connecting the nose part frames begins.

At least one nose pad 1 is arranged on a nose pad holder 3 for direct contact with the nose. In FIG. 1, two nose pads 1 are shown, which are attached to the nose pad holder 3. Furthermore, the view detection glasses 2 have a right eye capturing camera 8, which is arranged in the right nose part frame 4, and a left eye capturing camera 9, which is arranged in the left nose part frame 5 of the view detection glasses. Furthermore, IR light sources 10, 11 are arranged in the nose part frame 4, 5.

As shown in FIG. 2, the view detection glasses 2 furthermore have a field of view camera 15. In a manner known per se, this takes up the field of vision of the wearer when the view detection glasses 2 are worn.

It can also be provided that the nose pad 1 is attached directly to the view detection glasses 2, to the nose part frame 4, 5, or to the nose bridge 14.

Particularly preferably, however, it is provided that the nose pad 1 is arranged on a nose pad holder 3 that is separate from the view detection glasses 2. This has the advantage that one and the same view detection glasses 2 can be used alternately by different people, an individual nose pad holder 3 having at least one nose pad 1 being produced for each person. When changing the view detection glasses 2 from one wearer to another wearer, only a corresponding change of the nose pad holder 3 is required.

The detection of the topography takes place optoelectronically in the measuring step by means of a camera 8, 9, 15, in particular a digital camera. This is easy, quick, and contact-free.

In order to allow for a simple detection of the topography of at least the nasal ridge, it can particularly preferably be provided that a topography of at least the nasal ridge of the person is detected, wherein the detection of the topography takes place in the measuring step by means of a camera of a cell phone, wherein the camera is moved in front of the face and to the side of the person's head in order to generate topography data of the measured region of the head from a plurality of recorded images. Cell phone cameras are becoming more powerful and many cell phones available at the time of application have high-resolution cameras.

A 3D scan of the face, in particular of the nose, eye, and ear regions, is carried out, so to speak.

Particularly preferably, however, it is provided that the detection of the topography takes place with the field of view camera 15 of the view detection glasses 2 in the measuring step. This means that no additional camera is required. In addition, the properties of this camera 15 are precisely known, which is not ensured when using any cell phone. The view detection glasses 2 are of course held in such a way that the field of view camera 15 is actually directed at the user or the future wearer of the view detection glasses 2.

In order to adapt the view detection glasses 2 precisely to the head, it can preferably be provided that, in the measuring step, topography data are generated at least from the eye, temple, and ear regions of the person. Accordingly, all regions of the head can be measured that are relevant in order to adapt the view detection glasses 2 to the head shape of the person. The nasal ridge is particularly relevant in this case, since a large part of the weight of the view detection glasses 2 rests there; furthermore, the ear regions are particularly relevant for a good and comfortable fit of the view detection glasses 2, since the earpieces 6, 7 of the view detection glasses 2 rest on or against the regions of the ears, and a general fit of the view detection glasses 2 on the head can also be taken into account. In other words, the support and contact regions of the view detection glasses 2 on the head of the respective person are optimized. The support and contact regions are those regions where the view detection glasses 2 rest or are in contact on a region of the head. It can be provided to detect topographical data from the nose via the eyes via the temples up to the ears of the person. Eyes can also mean the region from the eyebrows to over the cheekbones of the person excluding the mouth and chin region.

Furthermore, a computer program product is provided with a program for a processing device which comprises portions of software code for carrying out parts of the method when it is executed on the processing device. The computer program product comprises a program that can communicate with a camera and generates the non-scaled topography data from the optoelectronic measurement in the measurement step. For this purpose, it can be provided that the program is compatible with cell phones, in particular with the Android and/or iOS operating systems, and can be installed accordingly on cell phones.

It can be provided that the program is executed on numerous different processing devices, such as a PC, tablet, or a cell phone.

In order to solve a known scaling problem of 3D scans, it is provided that, in a scaling step, the view detection glasses 2 are arranged on the head of the person, and at least one position value of the eyes of the person is determined by means of the eye capturing cameras 8, 9, wherein the non-scaled topography data are converted into scaled topography data based on the at least one position value. By using the eye capturing cameras 8, 9, a very high accuracy of the determined position value can be achieved. Furthermore, this can be fully automated, which makes any manual intervention superfluous.

In particular, at least one distance between the eyes is provided as at least one position value. It is primarily intended to determine a pupillary distance.

Furthermore, it is particularly preferably provided that, in the scaling step, a plurality of position values of the eyes are determined, which position values describe the positions of the two eyes in relation to a reference point of the view detection glasses 2. As a result, the asymmetries that occur in practically every face can be recognized and taken into account.

It is objectively assumed that the wearer has exactly two eyes. In the case of users with a different number of eyes, in particular the scaling steps must be adapted accordingly.

For the scaling step, a so-called basic setting nose pad is attached to the view detection glasses 2. This is actually any nose pad 1, the dimensions of which are known and which must be adapted so precisely to the wearer that the eye capturing cameras 8, 9 have a view of the eyes. In particular, a set of basic setting nose pads is provided, from which that one is selected which allows for the eye capturing cameras 8, 9 to have the best view of the user's eyes. It is also provided that the type of basic setting nose pad is also taken into account in the subsequent modeling step. The basic setting nose pads can, for example, be numbered consecutively.

It is provided that, in the modeling step, production data for at least one nose pad 1 for the view detection glasses 2 adapted to the nasal ridge are generated from the scaled topography data. This can be done, for example, by means of the computer program product already mentioned.

It is particularly preferably provided that, in the modeling step, a virtual 3D model of at least the nasal ridge, in particular the substantially entire head of the person, is generated based on the scaled topography data of at least the nasal ridge, preferably substantially the entire head of the person, a virtual positioning of a virtual reference view detection glasses 2 on the virtual 3D model taking place subsequently, the shape of a contact surface of at least one virtual nose pad 1 which is opposite to the contact regions of the nasal ridge being determined based on the position of the virtual reference view detection glasses 2 on the virtual 3D model.

The opposing contact surface of the nose pad 1 is preferably adapted to the surface conditions of the nasal ridge by means of a smoothing function. The opposing contact surface of the nose pad 1 is to be understood as a digital imprint of the nasal ridge.

For this purpose, it can preferably be provided that substantially the entire head of the person, or regions of the head, are represented virtually by means of the program on a display unit such as a display of the cell phone or on a monitor as a virtual 3D model. In this regard, it can be provided that the virtual reference view detection glasses 2 can be moved and positioned on the virtual head by means of an input such as touching the display on a touch display or by means of a computer mouse or by means of input commands.

In this regard, it can also be provided that the program automatically positions the virtual view detection glasses 2 in an expedient position on the virtual head based on an algorithm.

The optimal positioning of the virtual view detection glasses based on the focal length, the field-of-view (FOV), and/or the head shape can preferably also take place in an optimization step, this step being carried out in particular by means of the program.

It can further be provided that the program outputs output values that indicate a deviation from an ideal position and it can be provided in this regard that the program has an input option so that the user can manually influence the positioning of the virtual view detection glasses on the head by means of an input.

In order to allow for a particularly precise adaptation of the nose pad 1 to the nasal ridge, it can be provided that the at least one virtual nose pad 1 for the virtual reference view detection glasses 2 has a reference contact surface, and in that a two-dimensional distance field between the reference contact surface and the nasal ridge of the virtual head is ascertained in order to ascertain the production data of the at least one nose pad 1.

The reference contact surface is the required minimum thickness of the nose pad 1, which can preferably be flat. The space between the reference contact surface and the nasal ridge is particularly preferably filled virtually, so that the view detection glasses 2 fits well on the nasal ridge. Production data are also calculated based on this data.

In order to easily manufacture the at least one nose pad 1 adapted to at least the nasal ridge of the person, it can particularly preferably be provided that an additive fabricator, in particular a 3D printer, is used as the digital fabricator in the fabrication step. A 3D printer can quickly and easily produce a small number of customized nose pads 1.

Alternatively, a subtractive fabricator, for example a CNC milling machine, can produce at least one nose pad 1 by removing material, in particular, from a block.

It can be provided that the program transmits the production data for the nose pad 1 to be produced to the digital fabricator after the modeling and/or optimization step has been completed.

Furthermore, it can preferably be provided that, in the fabrication step, a nose pad holder 3 having at least one nose pad 1 is produced, the nose pad holder 3 having a connecting device for connecting to a base body. The nose pad holder 3 can preferably be clipped, plugged, or hooked into the rest of the frame of the glasses thereby allowing for a quick change between a plurality of nose pads 1 on the glasses 2.

It can be provided that the nose pad holder 3 and the at least one nose pad 1 are formed in one piece, whereby a particularly simple change of the nose pad holder 3 with the at least one nose pad 1 between a plurality of view detection glasses 2, which offer a suitable receptacle for the nose pad holder 3, can be accomplished. Thus, the nose pad 1 does not have to be removed from the nose pad holder 3 and mounted on another nose pad holder 3.

It can also be provided that the nose pad 1 comprises one or more nose pad(s).

It can be provided that the nose pad holder 3 and/or the earpieces 6, 7 and/or other parts of the view detection glasses 2 are produced by means of a 3D printer or a CNC milling machine.

It can be provided that the digital fabricator produces parts of the view detection glasses 2 from a single material, in particular from a plastics material.

It can also be provided that the digital fabricator produces parts of the view detection glasses 2 from a plurality of materials, in particular from different plastics materials.

It can be provided that parts of the view detection glasses 2 such as the nose pad holder 3 with the adapted nose pad 1 and/or the earpieces 6, 7 are produced in one piece by means of the digital fabricator.

It can further be provided that the entire view detection glasses 2, in particular the frame of the glasses, apart from the lenses of the glasses and the electronic components, are produced in one piece by means of a digital fabricator.

The invention claimed is:

1. A method for producing at least one nose pad of view for view detection glasses for a person, the view detection glasses having a right eye capturing camera, a left eye capturing camera, and a field of view camera, the method comprising:

measuring a topography of at least a nasal ridge of the person, the measuring of the topography including moving one of the right eye capturing camera, the left eye capturing camera, and the field of view camera in front of a face and to a side of the person's head in order to generate non-scaled topography data of a measured region of the head from a plurality of recorded images;

scaling the non-scaled topography data into scaled topography data based on at least one position value, the at least one position value being of the eyes of the person and being determined by the right and left eye capturing cameras when the view detection glasses are arranged on the head of the person, the view detection glasses comprising a predeterminable basic setting nose pad;

modeling comprising generating production data for at least one nose pad for the view detection glasses adapted to the nasal ridge from the scaled topography data; and fabricating comprising transmitting the production data to a digital fabricator and producing at least one nose pad based on the production data.

2. The method according to claim 1, wherein in the measuring step, the measuring of the topography is performed using the field of view camera.

3. The method according to claim 1, wherein, in the measuring step, topography data are generated at least from an eye region, a temple region, and ear regions of the person.

4. The method according to claim 1, wherein at least one distance between the eyes is determined as a position value in the scaling step.

5. The method according to claim 1, wherein, in the scaling step, a plurality of position values of the eyes are determined, which position values describe the positions of the two eyes in relation to a reference point of the view detection glasses.

6. The method according to claim 1, wherein, in the modeling step, a virtual 3D model of at least the nasal ridge is generated based on the scaled topography data of at least the nasal ridge, a virtual positioning of a virtual reference view detection glasses on the virtual 3D model taking place subsequently, a shape of a contact surface of at least one virtual nose pad which is opposite to the contact regions of the nasal ridge being determined based on the position of the virtual reference view detection glasses on the virtual 3D model.

7. The method according to claim 6, wherein the virtual 3D model is of substantially an entire head of the person, and the scaled topography data is of the entire head of the person.

8. The method according to claim 6, wherein the at least one virtual nose pad of the virtual reference view detection glasses has a reference contact surface, and wherein a two-dimensional distance field between the reference contact surface and the nasal ridge of the virtual head is ascertained in order to ascertain the production data of the at least one nose pad.

9. The method according to claim 1, wherein, in the fabrication step, a nose pad holder having at least one nose pad is produced, the nose pad holder having a connecting device for connecting to a base body of the view detection glasses.

10. View detection glasses having at least one nose pad, which nose pad is produced according to claim 1, the at least one nose pad being produced by means of a digital fabricator and being adapted to a topography of at least the nasal ridge of a person.

11. The method according to claim 1, wherein the measuring step is performed in a contactless manner.

* * * * *